US012731413B2

(12) United States Patent
Minakawa et al.

(10) Patent No.: US 12,731,413 B2
(45) Date of Patent: Sep. 8, 2026

(54) PRECEDING VEHICLE RECOGNITION DEVICE FOR VEHICLE

(71) Applicant: SUBARU CORPORATION, Tokyo (JP)

(72) Inventors: Masatoshi Minakawa, Tokyo (JP); Hayato Hori, Tokyo (JP); Tetsuo Shiraishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 162 days.

(21) Appl. No.: 18/782,140

(22) Filed: Jul. 24, 2024

(65) Prior Publication Data

US 2025/0069411 A1 Feb. 27, 2025

(30) Foreign Application Priority Data

Aug. 25, 2023 (JP) ................................ 2023-137229

(51) Int. Cl.
*G06V 20/58* (2022.01)
*G06V 20/56* (2022.01)

(52) U.S. Cl.
CPC ............ *G06V 20/58* (2022.01); *G06V 20/588* (2022.01); *G06V 2201/08* (2022.01)

(58) Field of Classification Search
CPC ............................ G06V 20/58; G06V 20/588
See application file for complete search history.

(56) References Cited

U.S. PATENT DOCUMENTS 11,472,481 B2* 10/2022 Kim ..................... B62D 15/025
12,351,174 B2* 7/2025 Lechner ............. B60W 30/143
2012/0209492 A1* 8/2012 Choi ..................... B60W 30/16 701/96
2013/0027511 A1* 1/2013 Takemura ............ G06V 20/588 348/42
2016/0229395 A1* 8/2016 Schmüdderich ......... B60Q 1/14
2018/0129887 A1* 5/2018 Kang ........................ G06T 7/70
2019/0322277 A1* 10/2019 Kuroki .................. B60W 30/16
2020/0218907 A1* 7/2020 Baik ....................... G06F 17/16
2020/0307560 A1* 10/2020 Shin ........................ G01S 7/415
2020/0307593 A1* 10/2020 Hirosawa ............. B60W 10/04

(Continued)

FOREIGN PATENT DOCUMENTS

JP 2021-62760 A 4/2021

*Primary Examiner* — Jess Whittington

(74) *Attorney, Agent, or Firm* — Rimon P.C.

(57) ABSTRACT

A preceding vehicle recognition device for a vehicle includes a driving environment recognition unit, a lane change determination unit, a preceding vehicle provisional registration unit, and a provisional registration cancellation unit. The driving environment recognition unit recognizes information about a driving environment including one or more lanes and vehicles on a road. The lane change determination unit determines whether the vehicle is in the process of changing lanes. The preceding vehicle provisional registration unit executes, from the start to the end of the changing lanes of the vehicle, a provisional registration that designates, as a preceding vehicle, one of the one or more vehicles in a target lane selected as a lane change destination. The provisional registration cancellation unit cancels, after the vehicle moves into the target lane, the provisional registration when the preceding vehicle is continuously identified as an adjacent vehicle for a set number of times.

4 Claims, 9 Drawing Sheets

(56) References Cited

U.S. PATENT DOCUMENTS

| | | | | |
|---|---|---|---|---|
| 2020/0307595 | A1* | 10/2020 | Kato | B60W 10/04 |
| 2021/0158696 | A1* | 5/2021 | McNew | G08G 1/207 |
| 2021/0334986 | A1* | 10/2021 | Huang | G08G 1/0133 |
| 2022/0105936 | A1* | 4/2022 | Watanabe | B60W 10/06 |
| 2022/0410899 | A1* | 12/2022 | Lee | B60W 10/184 |
| 2023/0031030 | A1* | 2/2023 | Park | B60W 60/001 |
| 2023/0311892 | A1* | 10/2023 | Kato | B60W 30/18163 701/26 |
| 2023/0316926 | A1* | 10/2023 | Itoh | B60W 40/04 701/301 |
| 2024/0051532 | A1* | 2/2024 | Inoue | B60W 40/02 |

* cited by examiner

FIG. 1

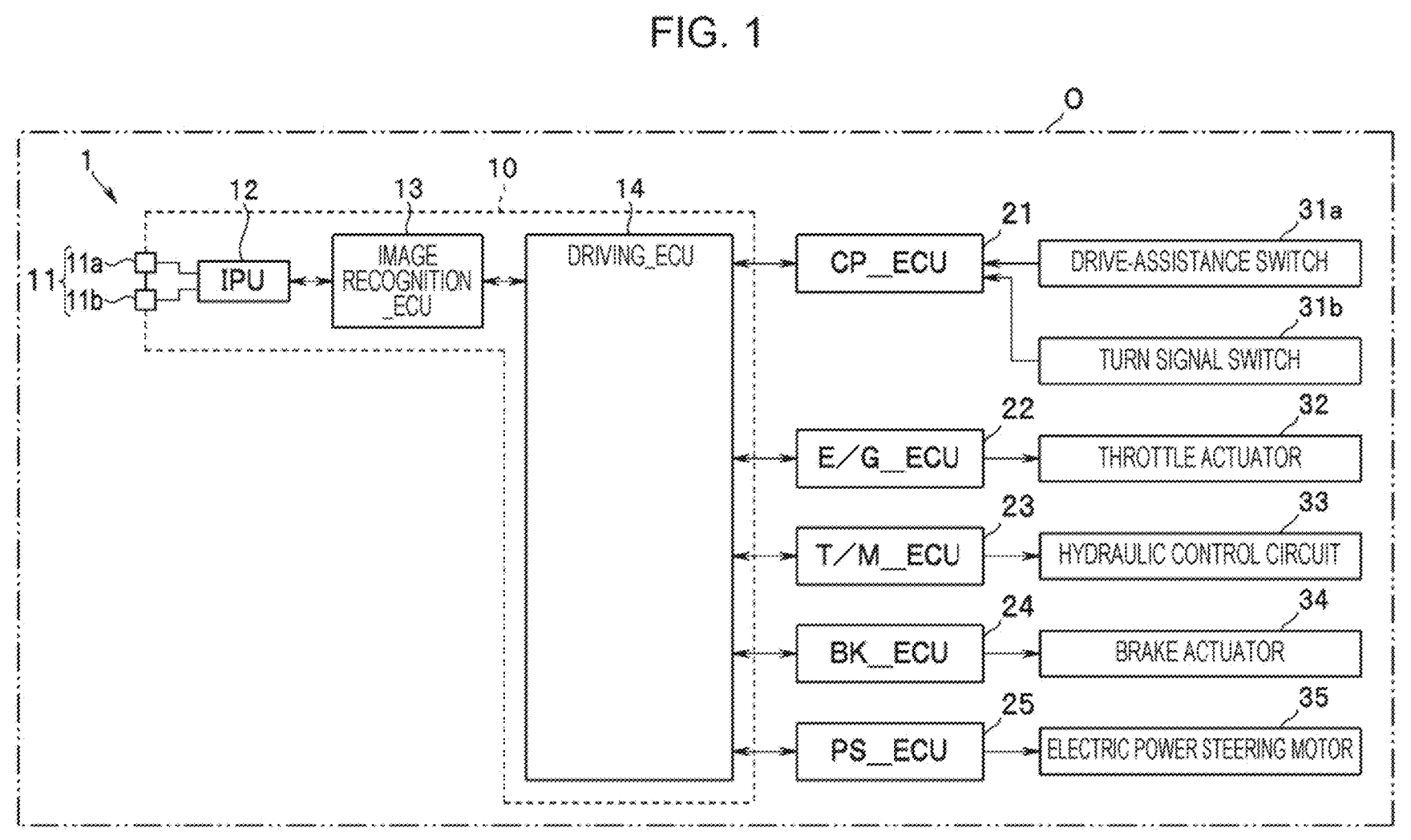

O
1
11
11a
11b
12 IPU
13 IMAGE RECOGNITION _ECU
10
14 DRIVING_ECU
21 CP_ECU
22 E/G_ECU
23 T/M_ECU
24 BK_ECU
25 PS_ECU
31a DRIVE-ASSISTANCE SWITCH
31b TURN SIGNAL SWITCH
32 THROTTLE ACTUATOR
33 HYDRAULIC CONTROL CIRCUIT
34 BRAKE ACTUATOR
35 ELECTRIC POWER STEERING MOTOR

Vp
P1
P2
Dp
O
REGISTERS PRECEDING VEHICLE
PROVISIONALLY REGISTERS PRECEDING VEHICLE

P1
P2
Dp
O
REGISTERS PRECEDING VEHICLE
PROVISIONALLY REGISTERS PRECEDING VEHICLE

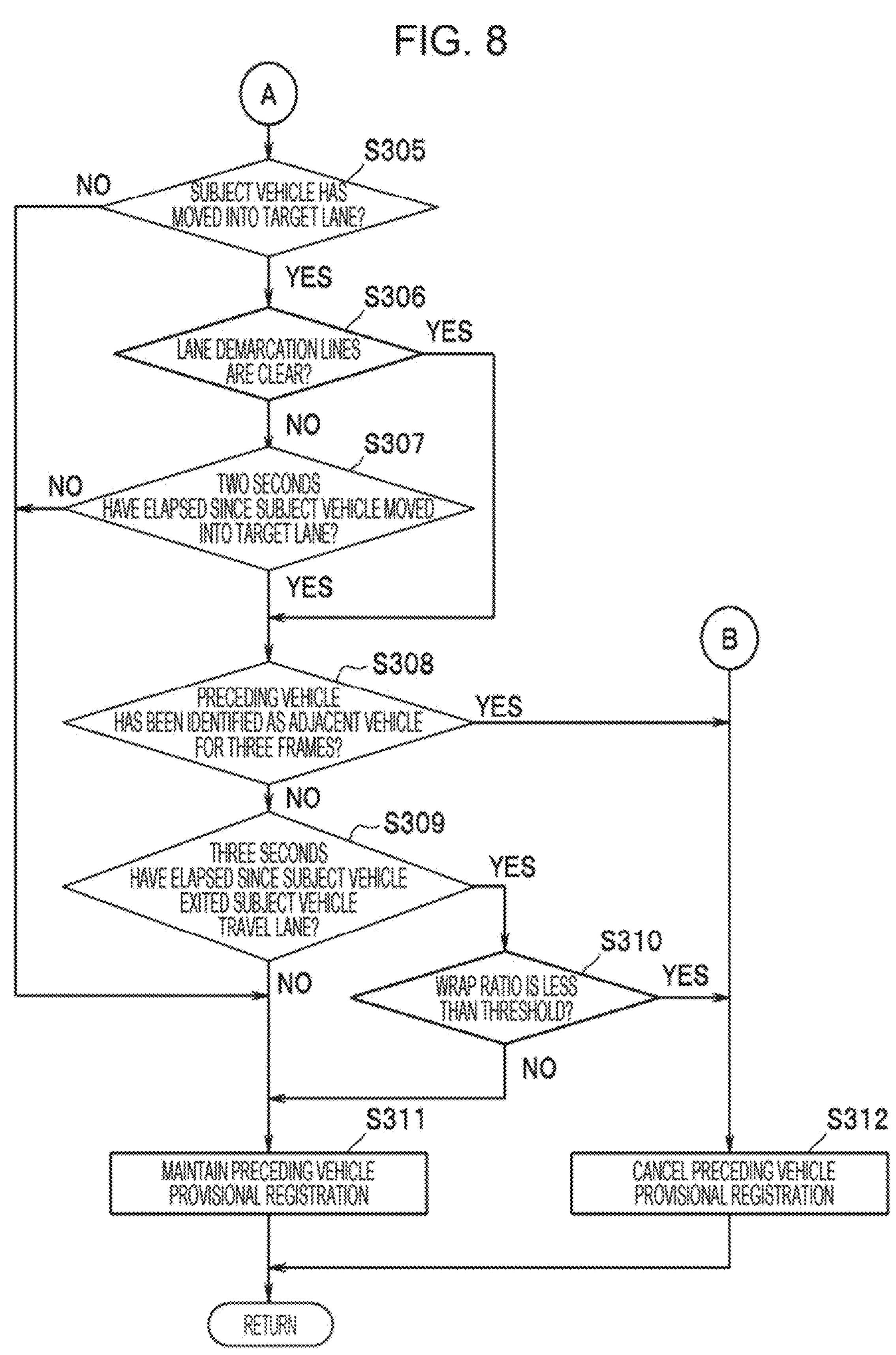
FIG. 8
A
S305
SUBJECT VEHICLE HAS MOVED INTO TARGET LANE?
NO
YES
S306
LANE DEMARCATION LINES ARE CLEAR?
YES
NO
S307
TWO SECONDS HAVE ELAPSED SINCE SUBJECT VEHICLE MOVED INTO TARGET LANE?
NO
YES
B
S308
PRECEDING VEHICLE HAS BEEN IDENTIFIED AS ADJACENT VEHICLE FOR THREE FRAMES?
YES
NO
S309
THREE SECONDS HAVE ELAPSED SINCE SUBJECT VEHICLE EXITED SUBJECT VEHICLE TRAVEL LANE?
YES
NO
S310
WRAP RATIO IS LESS THAN THRESHOLD?
YES
NO
S311
MAINTAIN PRECEDING VEHICLE PROVISIONAL REGISTRATION
S312
CANCEL PRECEDING VEHICLE PROVISIONAL REGISTRATION
RETURN

PRECEDING VEHICLE RECOGNITION DEVICE FOR VEHICLE

CROSS-REFERENCE TO RELATED APPLICATIONS

The present application claims priority from Japanese Patent Application No. 2023-137229 filed on Aug. 25, 2023, the entire contents of which are hereby incorporated by reference.

BACKGROUND

The disclosure relates to preceding vehicle recognition devices for vehicles, designed to recognize a preceding vehicle that travels ahead in the subject vehicle's travel lane.

In recent years, vehicles equipped with drive-assistance systems have been widely used in the field of vehicles, such as automobiles. Drive-assistance systems typically provide drive-assistance control by performing, for example, adaptive cruise control (ACC) and active lane keep centering (ALKC).

Typically, ACC selectively performs constant-speed driving control or vehicle-following driving control. Constant-speed driving control is designed to maintain the subject vehicle at a set speed that is set by the driver who drives the vehicle. This constant-speed driving control can be selected when there is no registered preceding vehicle to follow ahead of the subject vehicle. In vehicle-following driving control, the drive-assistance systems maintain a target inter-vehicle distance between the subject vehicle and the preceding vehicle. This vehicle-following driving control can be selected when there is a registered preceding vehicle ahead of the subject vehicle.

Preceding vehicle registration primarily targets another vehicle traveling ahead in the subject vehicle's travel lane. Thus, when the subject vehicle initiates a lane change, the registration of the preceding vehicle is temporarily cancelled until the subject vehicle completes the transition from the original travel lane to the target lane. In this regard, for example, Japanese Unexamined Patent Application Publication No. 2021-62760 discloses a technology that proactively registers a vehicle in the target lane as the preceding vehicle while the subject vehicle is in the process of changing lanes, provided that the vehicle in the target lane satisfies certain conditions.

SUMMARY

An aspect of the disclosure provides a preceding vehicle recognition device for a vehicle. The preceding vehicle recognition device includes a driving environment recognition unit, a lane change determination unit, a preceding vehicle provisional registration unit, and a provisional registration cancellation unit. The driving environment recognition unit is configured to recognize information about a driving environment including one or more lanes and one or more vehicles on a road. The lane change determination unit is configured to determine whether the vehicle is in the process of changing lanes. The preceding vehicle provisional registration unit is configured to execute, from start to end of the changing lanes of the vehicle, a provisional registration that designates, as a preceding vehicle, one of the one or more vehicles that is in a target lane selected as a lane change destination. The provisional registration cancellation unit is configured to cancel, after the vehicle moves into the target lane, the provisional registration when the preceding vehicle is continuously identified as an adjacent vehicle for a set number of times.

An aspect of the disclosure provides a preceding vehicle recognition device for a vehicle. The preceding vehicle recognition device includes a processor. The processor is configured to recognize information about a driving environment including one or more lanes and one or more vehicles on a road. The processor is configured to determine whether the vehicle is in a process of the changing lanes. The processor is configured to execute, from start to end of changing lanes of the vehicle, a provisional registration that designates, as a preceding vehicle, one of the one or more vehicles that is in a target lane selected as a lane change destination. The processor is configured to cancel, after the vehicle moves into the target lane, the provisional registration when the preceding vehicle is continuously identified as an adjacent vehicle for a set number of times.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 1 is a schematic diagram illustrating a configuration of a drive-assistance system for a vehicle;

FIG. 8 is a flowchart (part 2) illustrating the routine for canceling the provisional registration of the preceding vehicle;

DETAILED DESCRIPTION

Figure 2:
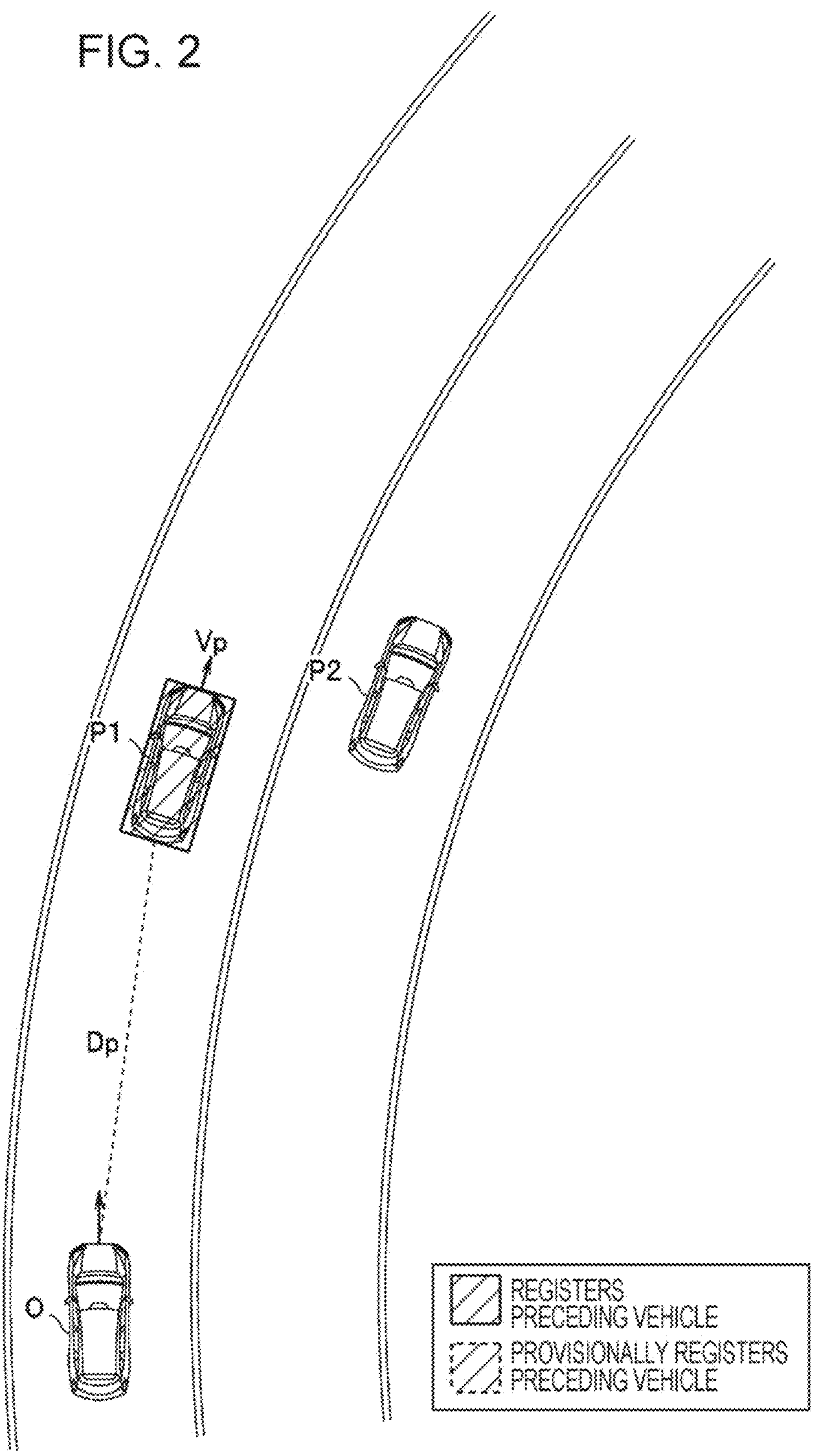
FIG. 2 illustrates a preceding vehicle registered in a subject vehicle travel lane.

During lane changes, lane recognition accuracy may be lower than usual. In particular, when there is a curve ahead of the vehicle, distinguishing between the target lane and other lanes may be ambiguous. In such situations, if a vehicle traveling in a non-target lane is proactively yet erroneously registered as the preceding vehicle during lane changes, there is room for improvement to avoid unnecessary deceleration, such as that caused by vehicle-following driving control.

It is desirable to provide preceding vehicle recognition devices for vehicles, designed to promptly cancel the registration of a vehicle that is erroneously registered as a preceding vehicle during lane changes.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 is a schematic diagram illustrating a configuration of a drive-assistance system for a vehicle.

As illustrated in FIG. 1, a drive-assistance system 1 includes a camera unit 10. The camera unit 10 is, for example, fixed at the upper center of the front part of the cabin of a subject vehicle O to which the drive-assistance system 1 is applied.

The camera unit 10 includes a stereo camera 11 serving as an image capturing unit, an image processing unit (IPU) 12, an image recognition unit (image recognition_ECU) 13, and a driving control unit (driving_ECU) 14.

The stereo camera 11 includes a main camera 11*a* and a sub-camera 11*b* as sensors. The main camera 11*a* and the sub-camera 11*b* include imaging elements such as complementary metal-oxide semiconductor (CMOS) devices. The main camera 11*a* and the sub-camera 11*b* are, for example, symmetrically positioned on the left and right sides of the center of the vehicle in the vehicle width direction. As a result, the main camera 11*a* and the sub-camera 11*b* capture stereo images of the driving environment of the exterior area in front of the vehicle from different viewpoints at predetermined image capturing intervals with synchronization between the main camera 11*a* and the sub-camera 11*b*.

The IPU 12 is operable to process images of the driving environment captured by the stereo camera 11 in a predetermined manner. By doing this, the IPU 12 detects the edges of various objects represented in the images, such as three-dimensional objects and demarcation lines on the road surface. The IPU 12 is also operable to obtain distance information based on the amount of misalignment between corresponding edges in the left and right images. Accordingly, the IPU 12 generates image information including distance information (distance-image information).

The image recognition_ECU 13 is operable to recognize lane demarcation lines that define lanes on the road, based on related information including distance-image information received from the IPU 12. For example, the image recognition_ECU 13 calculates the curvature [1/m] of the left and right lane demarcation lines that define individual lanes on the road, and the width between the left and right demarcation lines (lane width). The image recognition_ECU 13 is also operable to calculate the lane width based on the difference in curvature between the left and right demarcation lines. Through these lane demarcation line recognition operations, the image recognition_ECU 13 recognizes the lanes on the road, including the lane (subject vehicle travel lane) in which the subject vehicle O is traveling.

The image recognition_ECU 13 is also operable to perform other operations including predetermined pattern matching on distance-image information. This allows the image recognition_ECU 13 to recognize three-dimensional objects such as guard rails extending along the road, curbs, and surrounding vehicles traveling on the road. To recognize three-dimensional objects, the image recognition_ECU 13 identifies features such as the object type, object distance, object speed, and the relative speed between the object and the subject vehicle O.

The various kinds of information recognized by the image recognition_ECU 13 can be output as driving environment information to the driving_ECU 14.

The driving_ECU 14 serves as a control unit for overall control of the drive-assistance system 1.

The driving_ECU 14 is coupled to various control units, such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25, through in-vehicle communication lines such as a Controller Area Network (CAN).

Human-machine interfaces (HMIs) installed near the driver's seat, such as a drive-assistance switch 31*a* and a turn signal switch 31*b*, are coupled to the CP_ECU 21.

The drive-assistance switch 31*a* is designed for configuring various settings related to drive-assistance control. For example, the drive-assistance switch 31*a* enables the driver to select a desired drive-assistance mode from multiple drive-assistance modes that are preset in the driving_ECU 14. The drive-assistance switch 31*a* also enables the driver to set a target speed (set speed Vset) for constant-speed driving control, which will be described later.

Components including a throttle actuator 32 for an electronic control throttle are coupled to the output side of the E/G_ECU 22. Various sensors such as an accelerator pedal sensor (not illustrated) are coupled to the input side of the E/G_ECU 22.

The E/G_ECU 22 is operable to perform drive control of the components including the throttle actuator 32, for example, based on control signals from the driving_ECU 14 or detection signals from the various sensors. By performing this drive control, the E/G_ECU 22 adjusts the engine airflow rate to produce the desired engine output. The E/G_ECU 22 is also operable to output signals detected by the various sensors, such as the degree of accelerator pedal opening, to the driving_ECU 14.

A hydraulic control circuit 33 is coupled to the output side of the T/M_ECU 23. Various sensors such as a shift position sensor (not illustrated) are coupled to the input side of the T/M_ECU 23.

The T/M_ECU 23 is operable to perform drive control of the components including the hydraulic control circuit 33, for example, based on engine torque signals estimated by the E/G_ECU 22 and detection signals from the various sensors. By performing this drive control, the T/M_ECU 23 activates components provided in an automatic transmission, such as frictional engagement elements and pulleys, to change the engine output to achieve the desired transmission ratio. The T/M_ECU 23 is also operable to output signals detected by the various sensors, such as the shift position, to the driving_ECU 14.

A brake actuator 34 is coupled to the output side of the BK_ECU 24. The brake actuator 34 is designed to individually adjust the pressure of brake fluid output to brake wheel cylinders provided for wheels. Various sensors such as a vehicle speed sensor, a yaw rate sensor, a brake pedal sensor, and a front/rear acceleration sensor are coupled to the input side of the BK_ECU 24.

The BK_ECU 24 is operable to perform drive control of the components including the brake actuator 34 based on control signals from the driving_ECU 14 or detection signals from the various sensors. By performing this drive control, the BK_ECU 24 applies braking forces to individual wheels as necessary to provide control such as forced braking control or yaw rate control on the subject vehicle O. The BK_ECU 24 is also operable to output signals detected by the various sensors, such as the brake operating state, yaw rate, front/rear acceleration, and vehicle speed, to the driving_ECU 14.

An electric power steering motor 35 is coupled to the output side of the PS_ECU 25. The electric power steering motor 35 is operable to supply steering torque to a steering mechanism, generated through the motor rotational force. Various sensors such as a steering torque sensor and a steering angle sensor are coupled to the input side of PS_ECU 25.

The PS_ECU 25 is operable to perform drive control of the components including the electric power steering motor 35 based on control signals from the driving_ECU 14 or detection signals from the various sensors. By performing this drive control, the PS_ECU 25 produces steering torque for the steering mechanism. The PS_ECU 25 is also operable to output signals detected by the various sensors, such as the steering torque and steering angle, to the driving_ECU 14.

For example, the driving_ECU 14 provides drive-assistance control by outputting various control signals to the E/G_ECU 22, the T/M_ECU 23, the BK_ECU 24, and the PS_ECU 25.

This drive-assistance control is achieved by appropriately combining technologies such as adaptive cruise control (ACC), active lane keep centering (ALKC), emergency lane keep assist (ELKA), and auto lane changing (ALC). For example, the driving_ECU 14 implements drive-assistance control corresponding to the specific drive-assistance mode selected by the driver, by appropriately combining the control technologies.

ACC is implemented by selectively performing vehicle-following driving control or constant-speed driving control. In ACC, the driving_ECU 14 performs preceding vehicle registration operation based on driving environment information. When a front vehicle ahead of the subject vehicle O satisfies predetermined registration conditions, the driving_ECU 14 registers this front vehicle as the preceding vehicle. When there is a registered preceding vehicle ahead of the subject vehicle O, the driving_ECU 14 performs vehicle-following driving control. In this vehicle-following driving control, the driving_ECU 14 sets a target inter-vehicle distance based on factors such as the speed of the preceding vehicle and performs acceleration/deceleration control to maintain the set target inter-vehicle distance. When there is no registered preceding vehicle L ahead of the subject vehicle O, the driving_ECU 14 performs constant-speed driving control.

In this constant-speed driving control, the driving_ECU 14 performs acceleration/deceleration control for the subject vehicle O using the set speed Vset input by the driver as the target speed.

ALKC and ELKA can be performed based on information included in driving environment information, such as lane demarcation line information. For example, the driving_ECU 14 designates the center of the subject vehicle travel lane as a target travel path that aligns with the lane demarcation lines on the left and right sides. The driving_ECU 14 accordingly performs controls including feedforward control and feedback control for steering, based on the target travel path. As such, the driving_ECU 14 maintains the subject vehicle O centered in the lane.

ALC can be performed based on information included in driving environment information, such as lane demarcation line information. For example, the driving_ECU 14 sets a target lateral position in a lane adjacent to the subject vehicle travel lane. The driving_ECU 14 also sets a target path that leads from a target route of the subject vehicle O to the target lateral position. The driving_ECU 14 accordingly performs controls including feedforward control and feedback control for steering, based on the target path. As such, the driving_ECU 14 causes the vehicle to move into the adjacent lane.

In ACC described above, the driving_ECU 14 primarily registers a vehicle (front vehicle) traveling ahead in the subject vehicle travel lane as the preceding vehicle. Thus, the registration of the preceding vehicle primarily presupposes that the driving_ECU 14 has registered any one lane on the road as the subject vehicle travel lane.

When the front vehicle ahead in the subject vehicle travel lane satisfies preset registration conditions, the driving_ECU 14 registers the front vehicle as the preceding vehicle. For example, as illustrated in FIG. 2, when there is a front vehicle P1 in the subject vehicle travel lane, in the case where an inter-vehicle distance Dp between the front vehicle P1 and the subject vehicle O is less than a set threshold Dth (for example, less than 105 [m]), and a speed Vp of the front vehicle P1 is less than the set speed Vset, the driving_ECU 14 registers the front vehicle P1 as the preceding vehicle.

This registration of the preceding vehicle can be cancelled when preset cancellation conditions are satisfied. For example, when the front vehicle P1 no longer satisfies the registration conditions as the preceding vehicle in relation to the subject vehicle O, the driving_ECU 14 cancels the registration of the preceding vehicle.

For example, when the subject vehicle O starts to change lanes to an adjacent lane, the driving_ECU 14 cancels the registration of the preceding vehicle. This is because the registration of the subject vehicle travel lane is canceled once a lane change is started. The determination of whether a lane change has been started is made, for example, based on whether a turn signal lamp has started flashing. The determination in this case can be made regardless of whether the flashing of the turn signal lamp is triggered by the driver's operation of the turn signal switch 31*b* or by ALC.

Here, from when the subject vehicle O starts a lane change until the subject vehicle O completes the lane change, the driving_ECU 14 provisionally registers a vehicle (front vehicle) that satisfies preset provisional registration conditions as the preceding vehicle, as an exception.

Figure 3:
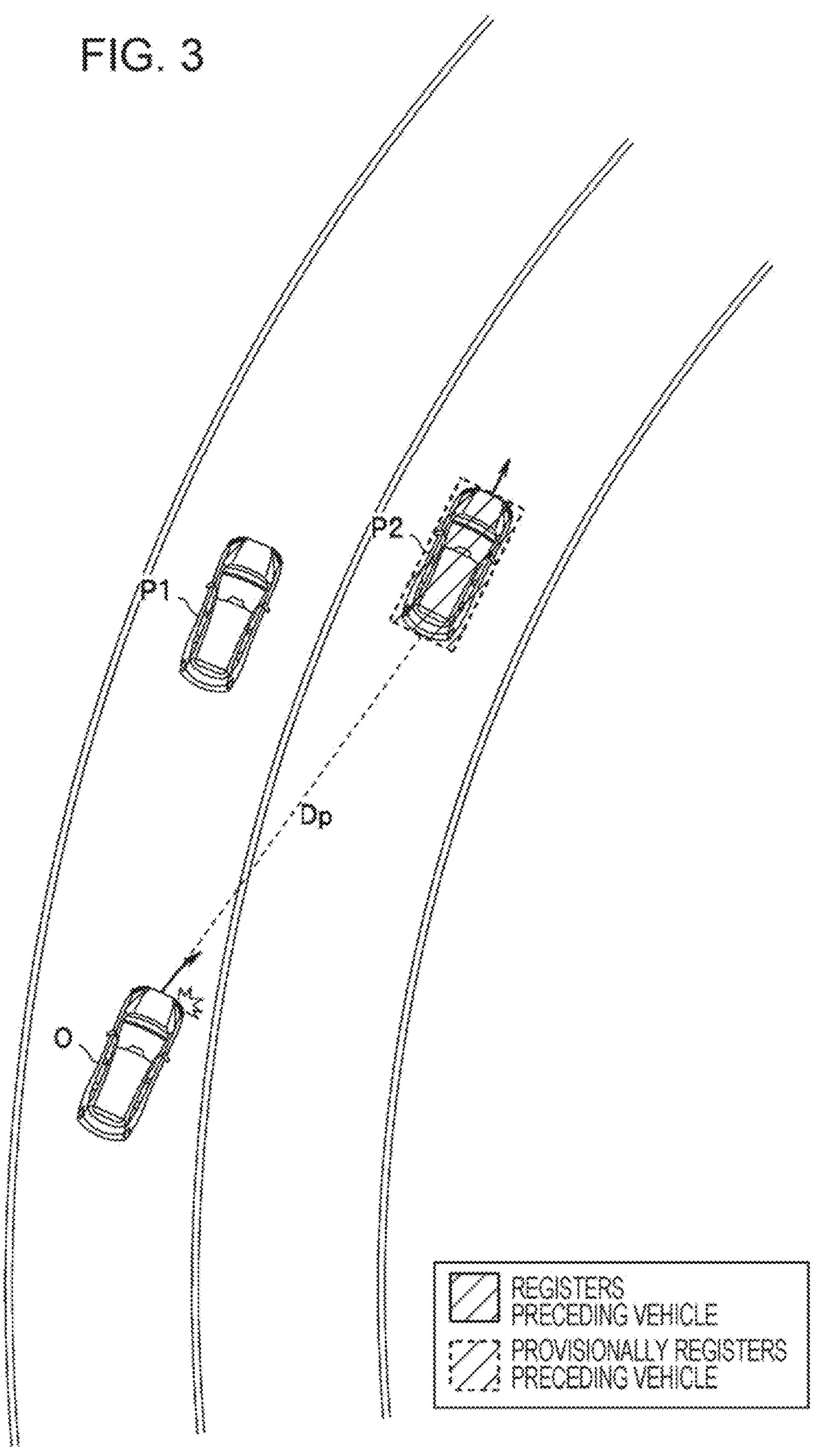
FIG. 3 illustrates a preceding vehicle provisionally registered during a lane change.

For example, as illustrated in FIG. 3, when there is a front vehicle P2 in the target lane designated as a lane change destination that the subject vehicle O is attempting to move into, in the case where an inter-vehicle distance Dp between the front vehicle P2 and the subject vehicle O is less than the set threshold Dth, and a speed Vp of the front vehicle P2 is less than the set speed Vset, the driving_ECU 14 provisionally registers the front vehicle P2 as the preceding vehicle. Once the preceding vehicle has been provisionally registered, the driving_ECU 14 performs vehicle-following driving control for the provisionally registered preceding vehicle.

Figure 4:
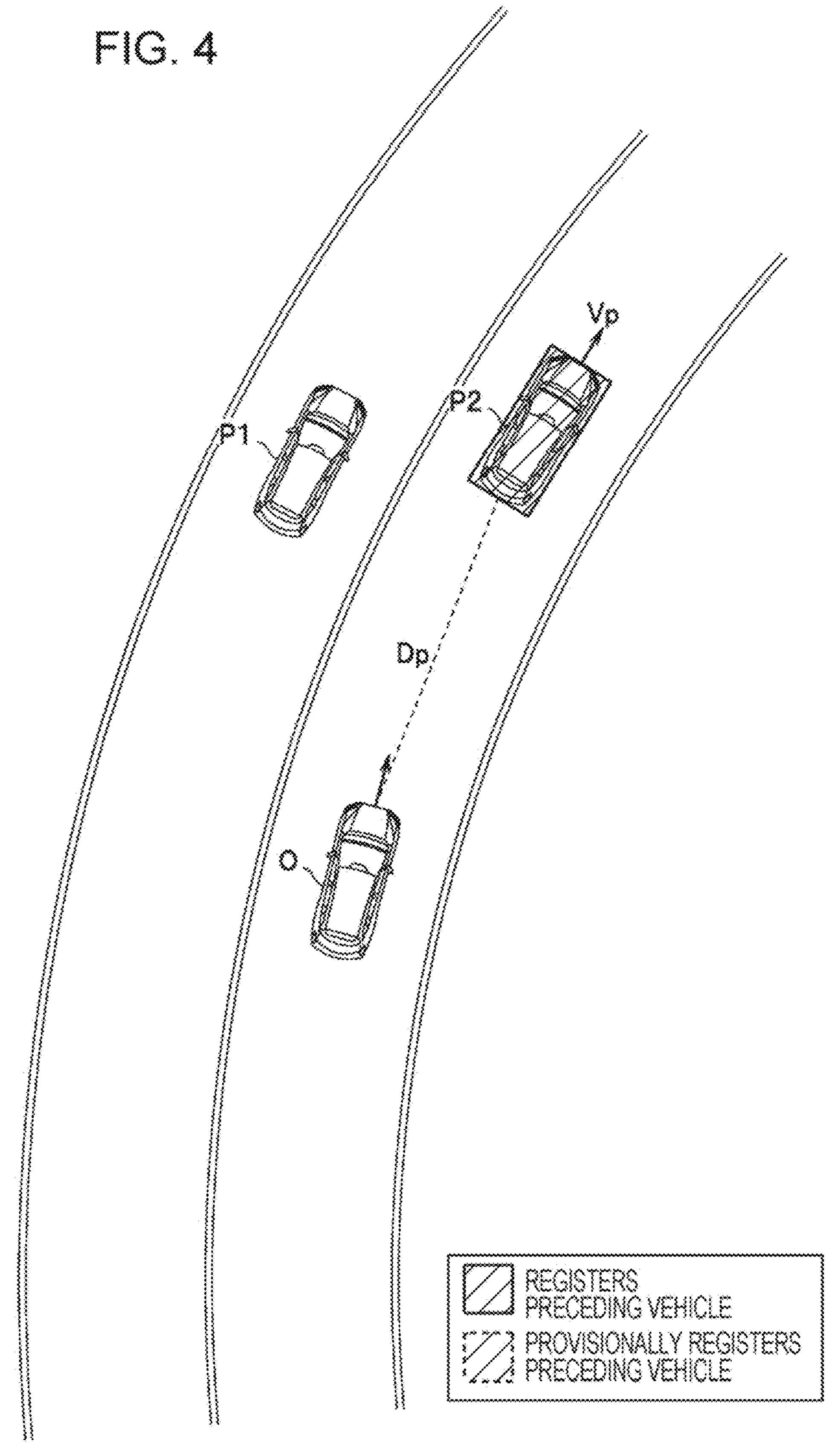
FIG. 4 illustrates a preceding vehicle registered in a subject vehicle travel lane after the lane change.

This provisional registration of the preceding vehicle can be cancelled when preset cancellation conditions are satisfied. For example, when the front vehicle P2 no longer satisfies the provisional registration conditions as the preceding vehicle in relation to the subject vehicle O, the driving_ECU 14 cancels the provisional registration of the preceding vehicle. For example, as illustrated in FIG. 4, when the target lane is registered as the subject vehicle travel lane, and the front vehicle P2 is definitively registered as the preceding vehicle traveling in the subject vehicle travel lane, the driving_ECU 14 accordingly cancels the provisional registration of the front vehicle P2 as the preceding vehicle.

Moreover, when the driving_ECU 14 determines that the provisional registration of the preceding vehicle is made in error, the driving_ECU 14 cancels the provisional registration of the preceding vehicle. For example, after the subject vehicle O completes a lane change into the target lane, when the front vehicle P2, which has been provisionally registered as the preceding vehicle, is continuously identified as an adjacent vehicle for a set number of times (for example, three frames), the driving_ECU 14 cancels the provisional registration as the preceding vehicle. In this case, when the lane demarcation lines defining the target lane are unclear, it is suitable to determine whether the preceding vehicle is an adjacent vehicle after a set time duration (for example, two seconds) has elapsed since the subject vehicle O entered the target lane.

Figure 5:
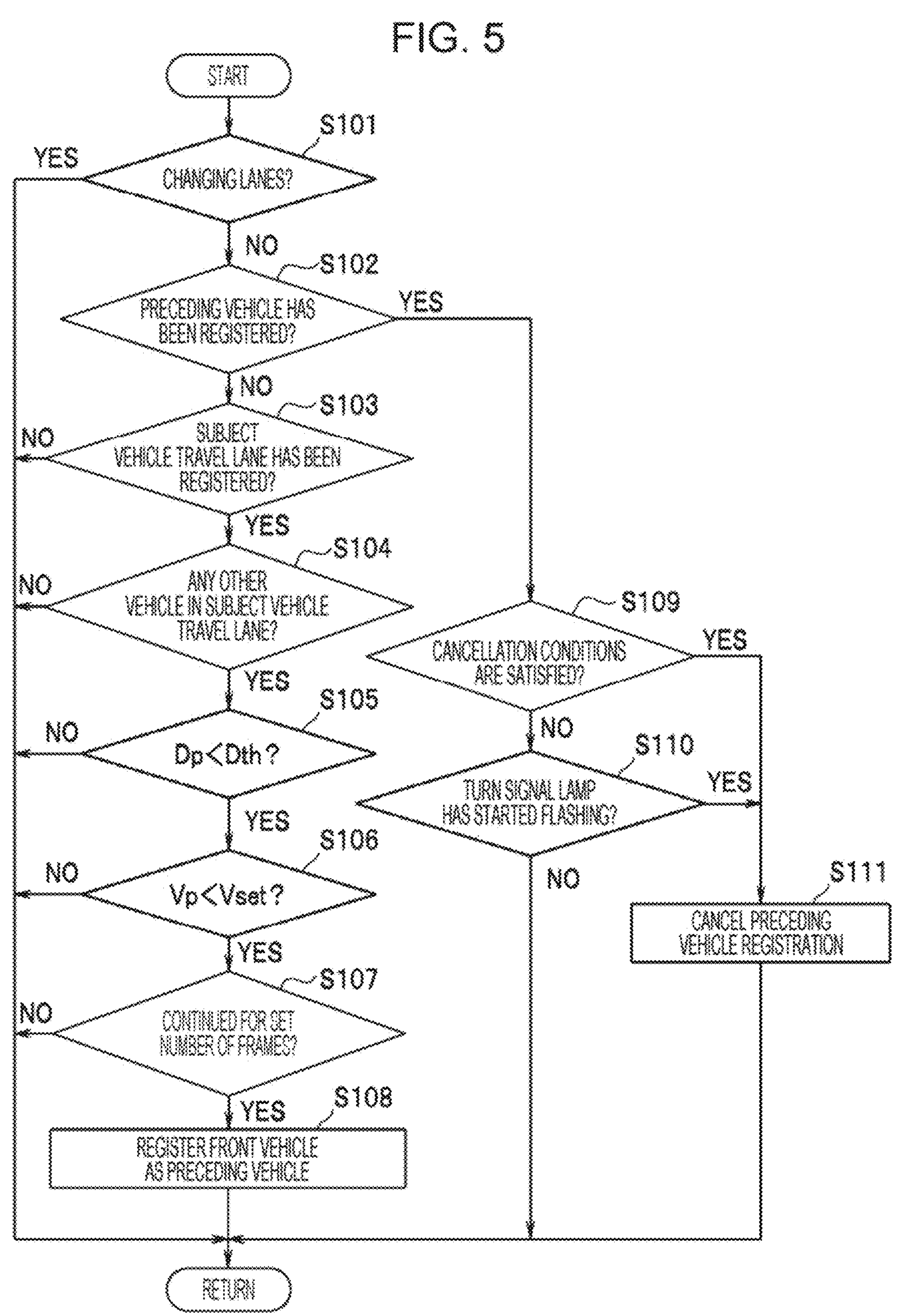
FIG. 5 is a flowchart illustrating a routine for registering the preceding vehicle and canceling the registration of the preceding vehicle.

Next, a process for registering the preceding vehicle and canceling the registration of the preceding vehicle will be described through a flowchart illustrating a routine for registering the preceding vehicle and canceling the registration of the preceding vehicle in FIG. 5. This routine can be repeated at set time intervals by the driving_ECU 14.

Once the routine starts, in step S101, the driving_ECU 14 checks whether the subject vehicle O is in the process of changing lanes.

When it is determined in step S101 that the subject vehicle O is in the process of changing lanes (YES in step S101), the driving_ECU 14 exits the routine.

When it is determined in step S101 that the subject vehicle O is not in the process of changing lanes (NO in step S101), the driving_ECU 14 proceeds to step S102.

In step S102, the driving_ECU 14 checks whether there is currently a front vehicle P registered as the preceding vehicle.

When it is determined in step S102 that there is a front vehicle P registered as the preceding vehicle (YES in step S102), the driving_ECU 14 proceeds to step S109.

When it is determined in step S102 that no front vehicle P has been registered as the preceding vehicle (NO in step S102), the driving_ECU 14 proceeds to step S103.

In step S103, the driving_ECU 14 checks whether any one lane on the road has been registered as the subject vehicle travel lane at the present time.

When it is determined in step S103 that the subject vehicle travel lane has not been registered (NO in step S103), the driving_ECU 14 exits the routine.

When it is determined in step S103 that the subject vehicle travel lane has been registered (YES in step S103), the driving_ECU 14 proceeds to step S104.

In step S104, the driving_ECU 14 checks whether there is a vehicle (the front vehicle P) in the subject vehicle travel lane.

When it is determined in step S104 that there is no front vehicle P in the subject vehicle travel lane (NO in step S104), the driving_ECU 14 exits the routine.

When it is determined in step S104 that there is a front vehicle P in the subject vehicle travel lane (YES in step S104), the driving_ECU 14 proceeds to step S105.

In step S105, the driving_ECU 14 checks whether the inter-vehicle distance Dp between the front vehicle P and the subject vehicle O is less than the set threshold Dth.

When it is determined in step S105 that the inter-vehicle distance Dp is greater than or equal to the set threshold Dth (NO in step S105), the driving_ECU 14 exits the routine.

When it is determined in step S105 that the inter-vehicle distance Dp is less than the set threshold Dth (YES in step S105), the driving_ECU 14 proceeds to step S106.

In step S106, the driving_ECU 14 checks whether the speed Vp of the front vehicle P is less than the set speed Vset of the subject vehicle O.

When it is determined in step S106 that the speed Vp of the front vehicle P is greater than or equal to the set speed Vset (NO in step S106), the driving_ECU 14 exits the routine.

When it is determined in step S106 that the speed Vp of the front vehicle P is less than the set speed Vset (YES in step S106), the driving_ECU 14 proceeds to step S107.

In step S107, the driving_ECU 14 checks whether a situation, in which the inter-vehicle distance Dp is less than the set threshold Dth, and the speed Vp is less than the set speed Vset, has continued for a set number of frames.

When it is determined in step S107 that the situation, in which the inter-vehicle distance Dp is less than the set threshold Dth, and the speed Vp is less than the set speed Vset, has not continued for the set number of frames (NO in step S107), the driving_ECU 14 exits the routine.

When it is determined in step S107 that the situation, in which the inter-vehicle distance Dp is less than the set threshold Dth, and the speed Vp is less than the set speed Vset, has continued for the set number of frames (YES in step S107), the driving_ECU 14 proceeds to step S108.

When proceeding from step S107 to step S108, the driving_ECU 14 registers the front vehicle P as the preceding vehicle and exits the routine.

When proceeding from step S102 to step S109, the driving_ECU 14 checks whether the cancellation conditions for the preceding vehicle registration are satisfied. As one of the cancellation conditions, the driving_ECU 14 checks, for example, whether the preceding vehicle has been lost from the subject vehicle travel lane. As one of the cancellation conditions, the driving_ECU 14 also checks, for example, whether a situation in which the inter-vehicle distance Dp is greater than or equal to the set threshold Dth has continued for a set number of frames. As one of the cancellation conditions, the driving_ECU 14 also checks, for example, whether the speed Vp has consistently been greater than or equal to the set speed Vset for a set time duration.

When it is determined in step S109 that the cancellation conditions for the registration of the preceding vehicle are satisfied (YES in step S109), the driving_ECU 14 proceeds to step S111.

When it is determined in step S109 that the cancellation conditions for the registration of the preceding vehicle are not satisfied (NO in step S109), the driving_ECU 14 proceeds to step S110.

In step S110, the driving_ECU 14 checks whether a turn signal lamp corresponding to an adjacent lane has started flashing.

When it is determined in step S110 that no turn signal lamp is flashing (NO in step S110), the driving_ECU 14 exits the routine.

When it is determined in step S110 that a turn signal lamp has started flashing (YES in step S110), the driving_ECU 14 proceeds to step S111.

When proceeding from step S109 or S110 to step S111, the driving_ECU 14 cancels the registration of the front vehicle P as the preceding vehicle and then exits the routine.

Figure 6:
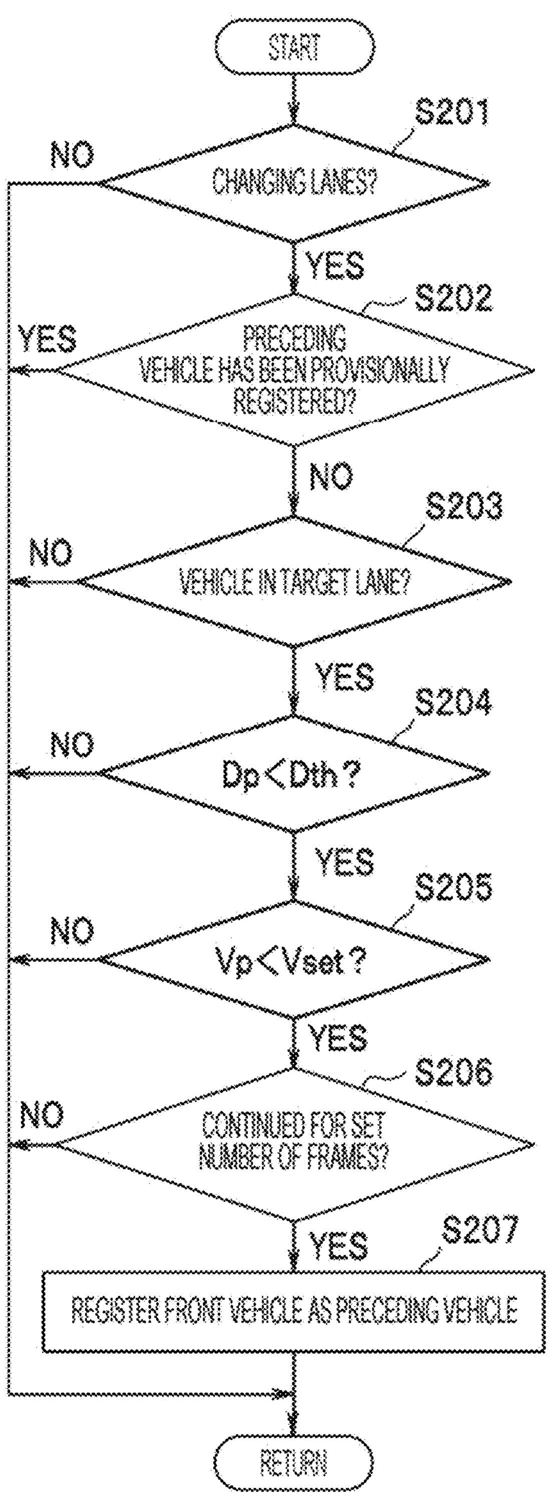
FIG. 6 is a flowchart illustrating a routine for provisionally registering the preceding vehicle.

Next, a process for provisionally registering the preceding vehicle will be described through a flowchart illustrating a routine for provisionally registering the preceding vehicle in FIG. 6. This routine can be repeated at set time intervals by the driving_ECU 14.

Once the routine starts, in step S201, the driving_ECU 14 checks whether the subject vehicle O is in the process of changing lanes.

When it is determined in step S201 that the subject vehicle O is not in the process of changing lanes (NO in step S201), the driving_ECU 14 exits the routine.

When it is determined in step S201 that the subject vehicle O is in the process of changing lanes (YES in step S201), the driving_ECU 14 proceeds to step S202.

In step S202, the driving_ECU 14 checks whether there is currently a front vehicle P provisionally registered as the preceding vehicle.

When it is determined in step S202 that there is a front vehicle P provisionally registered as the preceding vehicle (YES in step S202), the driving_ECU 14 exits the routine.

When it is determined in step S202 that no front vehicle P has been provisionally registered as the preceding vehicle (NO in step S202), the driving_ECU 14 proceeds to step S203.

In step S203, the driving_ECU 14 checks whether there is a vehicle (the front vehicle P) in the target lane designated as the lane change destination.

When it is determined in step S203 that there is no front vehicle P in the target lane (NO in step S203), the driving_ECU 14 exits the routine.

When it is determined in step S203 that there is a front vehicle P in the target lane (YES in step S203), the driving_ECU 14 proceeds to step S204.

In step S204, the driving_ECU 14 checks whether the inter-vehicle distance Dp between the front vehicle P and the subject vehicle O is less than the set threshold Dth.

When it is determined in step S204 that the inter-vehicle distance Dp is greater than or equal to the set threshold Dth (NO in step S204), the driving_ECU 14 exits the routine.

When it is determined in step S204 that the inter-vehicle distance Dp is less than the set threshold Dth (YES in step S204), the driving_ECU 14 proceeds to step S205.

In step S205, the driving_ECU 14 checks whether the speed Vp of the front vehicle P is less than the set speed Vset of the subject vehicle O.

When it is determined in step S205 that the speed Vp of the front vehicle P is greater than or equal to the set speed Vset (NO in step S205), the driving_ECU 14 exits the routine.

When it is determined in step S205 that the speed Vp of the front vehicle P is less than the set speed Vset (YES in step S205), the driving_ECU 14 proceeds to step S206.

In step S206, the driving_ECU 14 checks whether a situation, in which the inter-vehicle distance Dp is less than the set threshold Dth, and the speed Vp is less than the set speed Vset, has continued for a set number of frames.

When it is determined in step S206 that the situation, in which the inter-vehicle distance Dp is less than the set threshold Dth, and the speed Vp is less than the set speed Vset, has not continued for the set number of frames (NO in step S206), the driving_ECU 14 exits the routine.

When it is determined in step S206 that the situation, in which the inter-vehicle distance Dp is less than the set threshold Dth, and the speed Vp is less than the set speed Vset, has continued for the set number of frames (YES in step S206), the driving_ECU 14 proceeds to step S207.

When proceeding from step S206 to step S207, the driving_ECU 14 provisionally registers the front vehicle P as the preceding vehicle and exits the routine.

Figure 7:
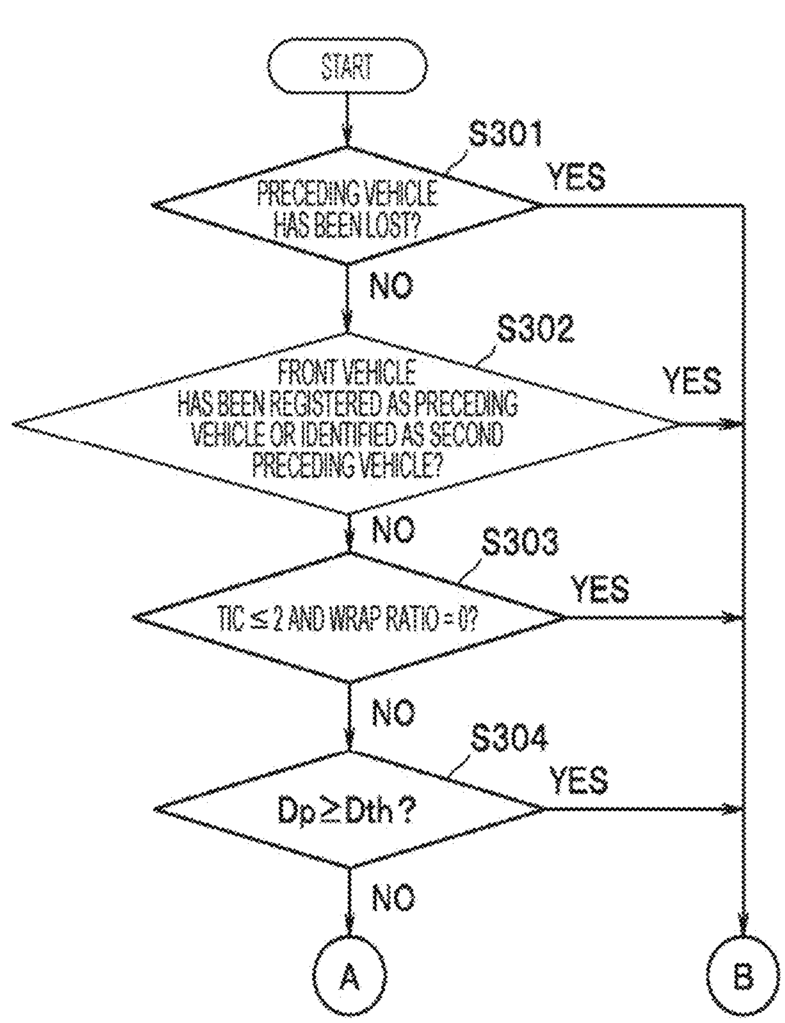
FIG. 7 is a flowchart (part 1) illustrating a routine for canceling the provisional registration of the preceding vehicle.

Next, a process for canceling the provisional registration of the preceding vehicle will be described through a routine for canceling the provisional registration of the preceding vehicle illustrated in FIGS. 7 and 8. This routine can be repeated at set time intervals by the driving_ECU 14.

Once the routine starts, in step S301, the driving_ECU 14 checks whether the preceding vehicle has been lost from the target lane.

When it is determined in step S301 that the preceding vehicle has been lost (YES in step S301), the driving_ECU 14 proceeds to step S312.

When it is determined in step S301 that the preceding vehicle has not been lost (NO in step S301), the driving_ECU 14 proceeds to step S302.

In step S302, the driving_ECU 14 checks whether the front vehicle P, provisionally registered as the preceding vehicle, has been newly registered as the preceding vehicle or identified as the second preceding vehicle that is farther away from the subject vehicle O than the preceding vehicle is.

When the front vehicle P is definitively registered as the preceding vehicle in step S302, or when the front vehicle P is identified as the second preceding vehicle (YES in step S302), the driving_ECU 14 proceeds to step S312.

When the front vehicle P is not definitively registered as the preceding vehicle in step S302, and the front vehicle P is not identified as the second preceding vehicle (NO in step S302), the driving_ECU 14 proceeds to step S303.

In step S303, the driving_ECU 14 checks whether a time-to-collision TTC with the provisionally registered preceding vehicle is less than or equal to two seconds, and whether the wrap ratio of the subject vehicle O with the provisionally registered preceding vehicle is 0 [%]. In situations where the time-to-collision TTC is less than or equal to two seconds, and the wrap ratio is 0 [%], it is assumed, for example, that the provisionally registered preceding vehicle is traveling almost parallel to the subject vehicle O, and that the subject vehicle O is likely to overtake the provisionally registered preceding vehicle.

When it is determined in step S303 that the time-to-collision TTC is less than or equal to two seconds, and the wrap ratio is 0 [%](YES in step S303), the driving_ECU 14 proceeds to step S312.

In step S303, when the time-to-collision TTC is greater than two seconds, or when the wrap ratio is greater than 0 [%](NO in step S303), the driving_ECU 14 proceeds to step S304.

In step S304, the driving_ECU 14 checks whether the inter-vehicle distance Dp to the provisionally registered preceding vehicle is greater than or equal to the set threshold Dth.

When it is determined in step S304 that the inter-vehicle distance Dp is greater than or equal to the set threshold Dth (YES in step S304), the driving_ECU 14 proceeds to step S312.

When it is determined in step S304 that the inter-vehicle distance Dp is less than the set threshold Dth (NO in step S304), the driving_ECU 14 proceeds to step S305.

In step S305, the driving_ECU 14 checks whether the subject vehicle O has moved into the target lane.

When it is determined in step S305 that the subject vehicle O has not moved into the target lane (NO in step S305), the driving_ECU 14 proceeds to step S311.

When it is determined in step S305 that the subject vehicle O has moved into the target lane (YES in step S305), the driving_ECU 14 proceeds to step S306.

In step S306, the driving_ECU 14 checks whether the lane demarcation lines defining the target lane are clearly recognized.

When it is determined in step S306 that the lane demarcation lines are clearly recognized (YES in step S306), the driving_ECU 14 proceeds to step S308.

When it is determined in step S306 that the lane demarcation lines are not clearly recognized (NO in step S306), the driving_ECU 14 proceeds to step S307.

In step S307, the driving_ECU 14 checks whether a set time duration (for example, two seconds) has elapsed since the subject vehicle O moved into the target lane.

When it is determined in step S307 that two seconds have not elapsed since the subject vehicle O moved into the target lane (NO in step S307), the driving_ECU 14 proceeds to step S311.

When it is determined in step S307 that two seconds have elapsed since the subject vehicle O moved into the target lane (YES in step S307), the driving_ECU 14 proceeds to step S308.

When proceeding from step S306 or S307 to step S308, the driving_ECU 14 checks whether a situation, in which the provisionally registered preceding vehicle has been identified as an adjacent vehicle, has continued for a set number of frames (for example, three frames).

When in step S308 the situation, in which the provisionally registered preceding vehicle has been identified as an adjacent vehicle, has continued for three frames (YES in step S308), the driving_ECU 14 proceeds to step S312.

In step S308, when the preceding vehicle is not identified as an adjacent vehicle, or when the situation, in which the provisionally registered preceding vehicle has been identified as an adjacent vehicle, has not continued for three frames (NO in step S308), the driving_ECU 14 proceeds to step S309.

In step S309, the driving_ECU 14 checks whether a set time duration (for example, three seconds) has elapsed since the subject vehicle O exited the original subject vehicle travel lane at the start of the lane change.

When it is determined in step S309 that three seconds have not elapsed since the subject vehicle O exited the subject vehicle travel lane (NO in step S309), the driving_ECU 14 proceeds to step S311.

When it is determined in step S309 that three seconds have elapsed since the subject vehicle O exited the subject vehicle travel lane (YES in step S309), the driving_ECU 14 proceeds to step S310.

In step S310, the driving_ECU 14 checks whether the wrap ratio of the subject vehicle O with the provisionally registered preceding vehicle is less than a preset threshold.

When it is determined in step S310 that the wrap ratio of the subject vehicle O is greater than or equal to the threshold (NO in step S310), the driving_ECU 14 proceeds to step S311.

When it is determined in step S310 that the wrap ratio of the subject vehicle O is less than the threshold (YES in step S310), the driving_ECU 14 proceeds to step S312.

When proceeding from step S305, S307, or S309 to step S311, the driving_ECU 14 exits the routine but maintains the provisional registration of the preceding vehicle.

When proceeding from step S301, S302, S303, S304, S308, or S310 to step S312, the driving_ECU 14 cancels the provisional registration of the preceding vehicle and subsequently exits the routine.

In this embodiment, the driving_ECU 14 provisionally registers the front vehicle P, which exists in the target lane as the lane change destination, as the preceding vehicle from the start to the end of the lane change of the subject vehicle O. The driving_ECU 14 then performs vehicle-following driving control based on the provisionally registered preceding vehicle. With this configuration, vehicle-following driving control can be performed when the subject vehicle travel lane is ambiguous during a lane change, in the case where the front vehicle P, which can be registered as the preceding vehicle after the lane change, is in the target lane.

Figure 9:
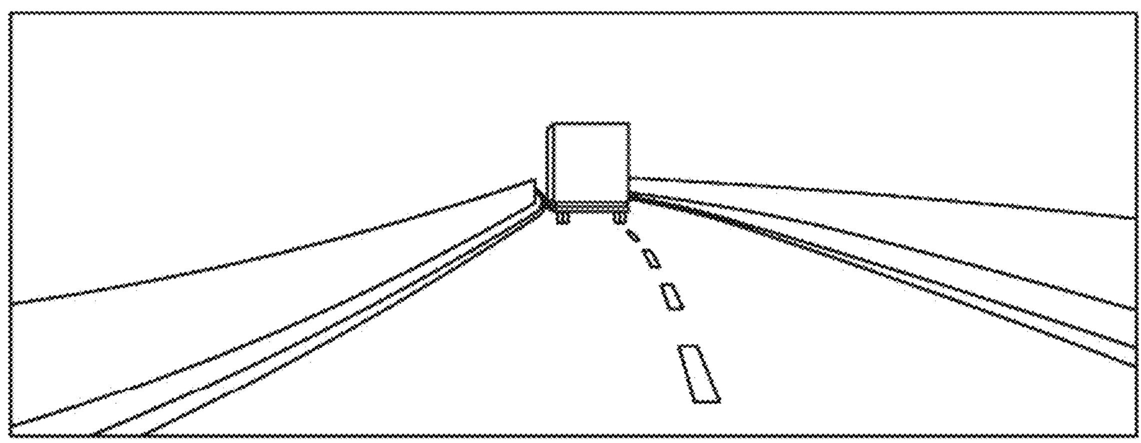
FIG. 9 illustrates an image of a driving environment at the start of a lane change.
Figure 10:
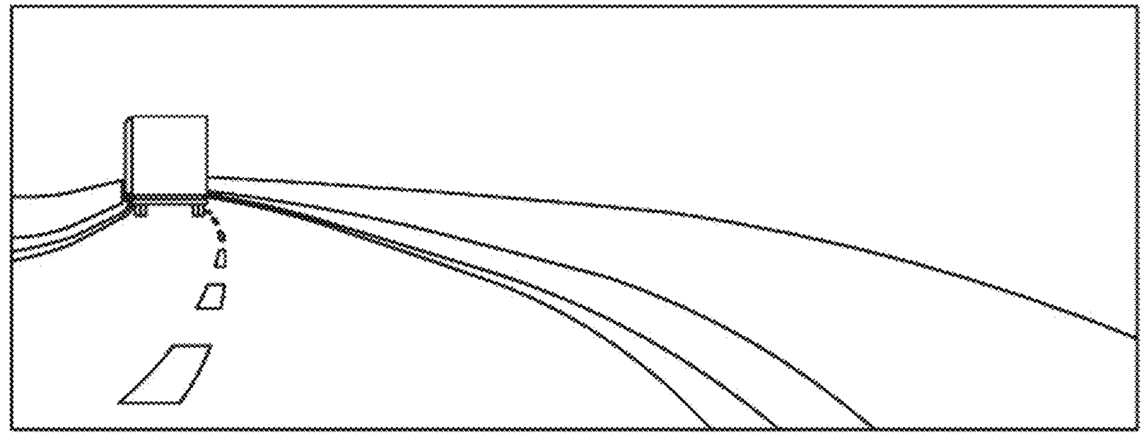
FIG. 10 illustrates an image of the driving environment after moving into a target lane.

After the subject vehicle O moved into the target lane, when the provisionally registered preceding vehicle is continuously identified as an adjacent vehicle for a set number of times, the driving_ECU 14 cancels the provisional registration of the preceding vehicle. With this configuration, when the front vehicle P is erroneously provisionally registered as the preceding vehicle, the provisional registration can be promptly canceled. For example, as illustrated in FIG. 9, when there is a curve ahead in the road that the subject vehicle O is traveling on, it can be unclear whether the vehicle ahead is the front vehicle traveling in the original subject vehicle travel lane that the subject vehicle O was traveling before changing lanes or the front vehicle traveling in the target lane. In the case where such a front vehicle is erroneously provisionally registered as the preceding vehicle, for example, as illustrated in FIG. 10, when the provisionally registered preceding vehicle is identified as an adjacent vehicle after the subject vehicle O has moved into the target lane, the provisional registration can be promptly cancelled.

In this case, when the lane demarcation lines defining the target lane are unclear, the driving_ECU 14 determines whether the preceding vehicle is an adjacent vehicle after a set time duration has elapsed since the subject vehicle O entered the target lane. With this configuration, when lane demarcation lines are unclear, the determination of whether the preceding vehicle is an adjacent vehicle can be made in a stable manner.

In the embodiment described above, the control units including the image recognition_ECU 13, the driving_ECU 14, the CP_ECU 21, the E/G_ECU 22, the T/M_ECU 23, the BK_ECU 24, and the PS_ECU 25 are implemented by a known microcomputer including elements such as a central processing unit (CPU), a random-access memory (RAN), a read-only memory (ROM), and a non-volatile memory, and peripheral devices. Programs to be run by the CPU and fixed data such as data tables may be previously stored in the ROM. All or part of the functions of the processor may be implemented by logic or analog circuits. Additionally, the operations of the various programs may be performed by an electronic circuit such as a field-programmable gate array (FPGA).

The image recognition_ECU 13, the driving_ECU 14, the CP_ECU 21, the E/G_ECU 22, the T/M_ECU 23, the BK_ECU 24, and the PS_ECU 25 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the image recognition_ECU 13, the driving_ECU 14, the CP_ECU 21, the E/G_ECU 22, the T/M_ECU 23, the BK_ECU 24, and the PS_ECU 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SPAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The disclosure described in the aforementioned embodiment is not limited to that specific embodiment. Various modifications can be applied at the implementation stage without departing from the essence of the disclosure. Furthermore, the embodiment includes examples at various stages, and various combinations of the disclosed configurational features can be appropriately selected to create different examples.

For example, when removing some configurational features from those described in the embodiment still addresses the described issues and achieves the described effects, the configuration omitting these configurational features can be selected as an example.

The preceding vehicle recognition devices for vehicles according to some embodiments of the disclosure can promptly cancel the registration of a vehicle that is erroneously registered as a preceding vehicle during lane changes.

The invention claimed is:

1. A preceding vehicle recognition device for a vehicle, the preceding vehicle recognition device comprising:

a driving environment recognition unit configured to recognize a driving environment including one or more lanes and one or more vehicles on a road;

a lane change determination unit configured to determine whether the vehicle is in a process of changing lanes;

a preceding vehicle provisional registration unit configured to execute, from start to end of a lane change of the vehicle, a provisional registration that designates, as a preceding vehicle, one of the one or more vehicles that is in a target lane selected as a lane change destination;

a driving control unit configured to perform vehicle-following driving control based on the vehicle provisionally registered as the preceding vehicle; and a provisional registration cancellation unit configured to:

determine that the provisional registration is made in error when, after the vehicle moves into the target lane, the vehicle provisionally registered as the preceding vehicle is continuously identified as traveling in a lane adjacent to the target lane for a set number of times; and cancel the provisional registration in response to determining that the provisional registration is made in error.

2. The preceding vehicle recognition device for the vehicle according to claim 1, wherein the provisional registration cancellation unit is configured to cancel, in a case where lane demarcation lines defining the target lane are not clearly recognized, the provisional registration when, after a set time duration has elapsed since the vehicle moved into the target lane, the vehicle provisionally registered as the preceding vehicle is continuously identified as traveling in a lane adjacent to the target lane for the set number of times.

3. The preceding vehicle recognition device for the vehicle according to claim 1, wherein the provisional registration cancellation unit is configured to cancel the provisional registration when the target lane is registered as a subject vehicle travel lane and the vehicle provisionally registered as the preceding vehicle is definitively registered as the preceding vehicle traveling in the subject vehicle travel lane.

4. A preceding vehicle recognition device for a vehicle, the preceding vehicle recognition device comprising:

a processor configured to:

recognize a driving environment including one or more lanes and one or more vehicles on a road;

determine whether the vehicle is in a process of changing lanes;

execute, from start to end of a lane change of the vehicle, a provisional registration that designates, as a preceding vehicle, one of the one or more vehicles that is in a target lane selected as a lane change destination;

perform vehicle-following driving control based on the vehicle provisionally registered as the preceding vehicle;

determine that the provisional registration is made in error when, after the vehicle moves into the target lane, the vehicle provisionally registered as the preceding vehicle is continuously identified as traveling in a lane adjacent to the target lane for a set number of times; and cancel the provisional registration in response to determining that the provisional registration is made in error.

* * * * *